United States Patent
Yu et al.

(10) Patent No.: US 6,917,688 B2
(45) Date of Patent: Jul. 12, 2005

(54) ADAPTIVE NOISE CANCELLING MICROPHONE SYSTEM

(75) Inventors: Zhuliang Yu, Singapore (SG); Wee Ser, Singapore (SG)

(73) Assignee: Nanyang Technological University, Singapore (SG)

(*) Notice: Subject to any disclaimer, the term of this patent is extended or adjusted under 35 U.S.C. 154(b) by 437 days.

(21) Appl. No.: 10/238,867

(22) Filed: Sep. 11, 2002

(65) Prior Publication Data
US 2004/0047464 A1 Mar. 11, 2004

(51) Int. Cl.[7] ............................................. H04B 15/00
(52) U.S. Cl. ..................................... 381/94.7; 381/122
(58) Field of Search ........................... 381/71.11, 71.12, 381/92, 71.1, 94.1, 94.7, 94.9; 379/392.01; 704/226–228, 233; 367/118–127

(56) References Cited

U.S. PATENT DOCUMENTS

| | | | |
|---|---|---|---|
| 4,742,548 A | 5/1988 | Sessler et al. | |
| 5,226,076 A | 7/1993 | Baumhauer, Jr. et al. | |
| 5,406,622 A | * 4/1995 | Silverberg et al. | 381/94.7 |
| 2002/0009203 A1 | * 1/2002 | Erten | 381/94.1 |

FOREIGN PATENT DOCUMENTS

| WO | WO 01/95666 | 12/2001 |
|---|---|---|

OTHER PUBLICATIONS

B. Widrow et al., "Adaptive Noise Cancellation: Principles and Applications," *Proc. IEEE*, 1975.

* cited by examiner

*Primary Examiner*—Forester W. Isen
*Assistant Examiner*—Daniel Swerdlow
(74) *Attorney, Agent, or Firm*—Davidson Berquist Jackson & Gowdey LLP

(57) ABSTRACT

An adaptive noise canceling microphone system for extracting a desired signal, in particular a desired speech signal, comprising two microphones being arranged at a predefined distance from each other; a signal forming system (SFS) being adapted to receive a first and second input signals resulting from sounds received by the two microphones wherein an acoustical signal component in the first input signal is determined, wherein an acoustical signal component in the second input signal is determined, wherein the acoustical signal component in the first input signal is enhanced to generate a speech enhanced signal, and wherein the acoustical signal component in the second input signal is suppressed to generate a speech nulled signal; an adaptive noise cancellation filtering circuit being adapted to receive the speech enhanced signal and the speech nulled signal, wherein the noise in the speech enhanced signal is cancelled using the speech nulled signal as reference, thereby generating an output filtered signal representing the desired signal.

19 Claims, 15 Drawing Sheets

ADAPTIVE NOISE CANCELLING MICROPHONE SYSTEM

This invention relates to an adaptive noise canceling microphone system which is capable of extracting desired signal from sounds containing noise.

BACKGROUND OF THE INVENTION

A noise canceling microphone system is gaining more importance nowadays, especially with the development of multimedia applications and wireless communication technologies. Although various solutions were proposed to enhance desired signal extraction, particularly desired speech, in noisy environments, there is still room for improvement in order to obtain a high Signal-to-Noise (SNR) ratio using very few microphones.

Various methods were commonly used to increase the SNR of desired speech signal. In a known speech enhancement method, a single microphone is used to pick up the desired speech signal with noise. The noise spectrum is estimated and subtracted from the speech signal (containing the noise) picked up by the microphone. In this way, the desired speech signal is separated from the noise. However this method is only effective with stationary noise, and also introduces high distortion to the desired speech signal.

Another known noise cancellation method uses two microphones, with one microphone located near the source of the desired signal, and another microphone located near the noise source. Thus, the signal picked up by the microphone arranged near the noise source can be used to adaptively cancel the noise signal from the signal picked up by the microphone arranged near the desired speech signal. This method is not practical in most applications as it is very difficult to arrange a microphone near the noise source.

A further known microphone array system uses more than two microphones. The system uses a spatial and temporal filtering method to enhance the desired speech signal from a specific direction and over an interested frequency band, and suppress signals from other directions. The desired signal obtained with this system has a high SNR. However the use of more than two microphones results in a large system, unsuitable for use in many mobile applications.

In the system disclosed in U.S. Pat. No. 4,742,548, more than three microphones are used to form a unidirectional microphone system for noise cancellation. Since no adaptive signal processing method is used in this system, the spatial response of this microphone system is fixed. This makes the whole system inflexible.

According to the system described in U.S. Pat. No. 5,226,076, two microphones are used to form a first-order microphone system for noise cancellation. However, this microphone system uses only the differential property of sound field to form a fixed beam pattern, the performance of the system is therefore poor, especially in environments with complicated noise signals.

system disclosed in WO 0,195,666, a cardioid-type directional microphone and an omni-directional microphone are combined in an acoustically coupled way. The two microphones, together with an adaptive control circuit, produce a very narrow 3-dimensional beam for acquiring the desired speech signal. However, the direction of the 3-dimension beam in this system is fixed. In other words, when the desired signal is coming from another direction which is different from the direction the beam is projected, the microphone system is not able to acquire the desired signal. The physical orientation of the system needs to be adjusted such that the desired signal falls into the direction of the 3-dimensional beam in order for the desired signal to be acquired. This makes the use of the system inconvenient.

Therefore, a noise cancellation microphone system with a high SNR and which is convenient to use is desired.

SUMMARY OF THE INVENTION

According to the invention, an adaptive noise canceling microphone system is provided, the adaptive noise canceling microphone system comprises two microphones being arranged at a predefined distance from each other, a signal forming system (SFS) for receiving a first and second input signal resulting from sounds received by the two microphones wherein an acoustical signal component in the first input signal is determined, wherein an acoustical signal component in the second input signal is determined, wherein the acoustical signal component in the first input signal is enhanced to generate a speech enhanced signal and wherein the acoustical signal component in the second input signal is suppressed to generate a speech nulled signal, and an adaptive noise cancellation filtering circuit for receiving the speech enhanced signal and the speech nulled signal, wherein the noise in the speech enhanced signal is cancelled using the speech nulled signal as reference, thereby generating an output filtered signal representing the desired signal.

The noise canceling microphone system according to the invention uses two general microphones to form a flexible microphone system. The two microphones are arranged preferably between 1 cm (centimeter) and 10 cm from each other, and further preferably between 2 cm and 3 cm from each other. It should however be noted that the microphones may be also be placed. The microphones used may be any kind of microphones, including omni-directional microphones or directional microphones. The microphones generate signals corresponding to the sounds they received, and the signals are received as first and second input signals by the Signal Forming System (SFS).

The SFS processes the first and second input signals using filtering techniques to generate the speech enhanced signal and the speech nulled signal. The acoustical signal component in the first and the acoustical signal component in the second input signal are an estimation of the desired signal in the first input signal and the second input signal, respectively. Therefore, the speech enhanced signal represents the sounds with the desired signal enhanced, and the speech nulled signal represents the sounds with the desired signal suppressed.

The microphone system according to the invention does not specifically require use of a combination of an omnidirectional microphone and a directional microphone, as disclosed in WO 0,195,666, to form a 3-dimensional beam for noise canceling. The beam is however formed by controlling the parameters of the filters used in the SFS. Moreover with the SFS, the desired signal need not come from a pre-defined direction as the SFS is able to detect the desired signal and form the 3-dimensional beam which is directed, automatically or manually, towards the direction of the desired signal. This thus allows the microphone system according to the invention to have a higher flexibility than the microphone system described in WO 0,195,666.

Both the speech enhanced signal and the speech nulled signal generated by the SFS are received by the adaptive noise cancellation filtering circuit for canceling the noise from the speech enhanced signal, using the speech nulled signal as a reference, to generate the output filtered signal which represents the desired signal. The noise cancellation process may be implemented using a Least Means Squared (LMS) filtering technique as disclosed in B. Widrow et al., "Adaptive Noise Cancellating: Principles and Applications," in Proc. IEEE, 1975 or a cross-talk cancellation technique as disclosed in US 20010048740 A1.

To further reduce noise from the output filtered signal (representing the desired signal), a post processing filtering circuit is provided. The post processing (PP) filtering circuit is adapted to receive the output filtered signal, with both the speech enhanced signal and the speech nulled signal as reference, to reduce any noise present in the output filtered signal, and to generate a digital result signal. This digital result signal represents the output filtered signal (which is also the desired signal) with noise further reduced.

An adaptive noise canceling microphone (ANCM) controller is preferably used to control at least one of the filters used in the SFS and the adaptive noise cancellation filtering circuit by updating the coefficients of the filters. The ANCM controller is adapted to receive the speech enhanced signal, the speech nulled signal and the output filtered signal, and generate an SFS control and an adaptive noise cancellation filter (ANCF) control signal to update the coefficients of the filters used in the SFS and the adaptive noise cancellation filtering circuit, respectively. In the preferred embodiment of the invention, the ANCM controller is also adapted to generate a PP control signal for updating the coefficients of at least one filter used in the PP filtering circuit.

The ANCM controller processes the speech enhanced signal, the speech nulled signal and the output filtered signal to determine characteristics of the input signals, and generates the optimized control signals for updating the coefficients of the filters used in the SFS, the adaptive noise cancellation filtering circuit and the PP filtering circuit. Specifically, each control signal represents a step size value for the respective filters, wherein the step size value is a parameter used for updating the weights or coefficients of the filters in this way, the updating of the weights or coefficients of the respective filters can be performed more efficiently.

The step size value used in the filters is important for ensuring the filters to work stably and effectively. The step size value is preferably set to a small value when a desired signal, in particular a desired speech, is detected.

The step size value is preferably set to a large value when the desired speech is not detected. When no signal is detected (when there is silence), the step size value is preferably set to zero resulting in the weight of the filter remaining unchanged, so that the filters can operate properly and stably.

Since the ANCM controller controls the step size values used for updating the filters in such a way that the values change in an adaptive manner depending on characteristics of the desired signal and are not assigned a fixed value according to the state of the art, it allows the microphone system according to the invention to be able to effectively cancel unwanted noise and remain the desired signal from the input signals.

The SFS according to the invention comprises a first Finite Impulse Response (FIR) filter, a second Finite Impulse Response (FIR) filter, a first adder and a second adder. The first FIR filter and the second FIR filter receive the first input signal and are adapted to determine the acoustical signal component in the first input signal, and to generate a first and second FIR filtered signal, respectively, which represent the acoustical signal component in the first input signal. The first adder adds the first filtered signal to the second input signal and generates the speech enhanced signal. The second adder subtracts the second FIR filtered signal from the second input signal and generates the speech nulled signal.

The coefficients of the FIR filters are designed to form a directionality pattern, in particular a 3-dimensional beam, directed at the desired signal such that any signals within this beam are retained as desired signals and any signals outside this beam are rejected as noise. The speech enhanced signal containing the desired signal extracted from these FIR filters however has a low SNR and therefore, further processing is thus needed to obtain the desired signal with a high SNR.

The coefficients of the FIR filters are preferably calculated by a Least Means Squared (LMS) algorithm block. In this case, the LMS algorithm block is adapted to receive the first input signal, the speech nulled signal and the SFS control signal to generate a LMS signal representing the coefficients of the FIR filters. The LMS algorithm block is able to change the coefficients of the FIR filters adaptively such that the directionality pattern is always directed at the desired signal.

In an alternative embodiment of the invention, information representing the coefficients of the first and second FIR filter and the second FIR filter is stored in a first Read Only Memory (ROM) and a second ROM, respectively. The coefficient information which is stored in the ROMs is pre-calculated by experiment with only the desired signal (without any noise or interference). The stored coefficient information is then used as the coefficients for the filters according to user's preference.

The adaptive noise cancellation filtering circuit according to the invention can be implemented in an LMS configuration which comprises an adaptive filter and an adder. The adaptive filter is adapted to receive the speech nulled signal, the ANCF control signal and an error signal (or the output filtered signal) to generate a filtered signal. The ANCF control signal is used to control the step size for updating the coefficients of the adaptive filter, and the error signal provides feedback information to the adaptive filter. The adder subtracts the filtered signal from the speech enhanced signal, and generates the error signal. A delay circuit is preferably added before the adder, wherein the delay circuit is adapted to receive and delay the speech enhanced signal and to generate a delayed signal.

In the preferred embodiment of the invention, an additional adaptive filter and an additional adder are used to form a cross-talk configuration. The additional adder receives an additional filtered signal and subtracts it from the speech nulled signal, and generates an additional error signal which is then received by the adaptive filter. The additional adaptive filter is adapted to receive the error signal, the additional error signal and the ANCF control signal and to generate the additional filtered signal which is also received by the additional adder. The addition filtered signal represents an estimated component of the desired signal in the error signal, the ANCF control signal is used to update the coefficients of the additional adaptive filter, and the additional error signal is used as a feedback information to the additional adaptive filter. This cross-talk configuration is advantageous because the filtered signal from the adaptive filter is a more accurate estimation of the noise signal than the filtered signal in the LMS configuration described earlier. Therefore, the output filtered signal from the adder in this cross-talk configuration represents the desired signal with a higher SNR.

The PP filtering circuit according to the invention comprises a FIR filter and a coefficient calculation block. The FIR filter of the PP filtering circuit is adapted to receive the output filtered signal and to generate the digital result signal. The coefficients of the FIR filter are updated by the coefficient calculation block. The coefficient calculation block is adapted to receive the speech enhanced signal, the speech nulled signal and the output filtered signal and to generate a coefficient signal used for updating the coefficients of the FIR filter. In the preferred embodiment of the invention, the coefficient calculation block is adapted to also receive the PP control signal as an input for generating the coefficient signal. The PP control signal is able to provide a suitable coefficient parameter, in particular a step size value, for updating the coefficients of the FIR filter, thus resulting in most optimal coefficients or weights for the FIR filter.

The adaptive noise cancellation controller according to the invention comprises a power estimator unit for each of the first input signal, the second input signal and the output filtered signal, a silence detector unit, a signal detector unit, an ANCF controller unit and a SFS controller unit.

The power estimator unit is adapted to generate a power signal corresponding to the estimated power of the received signal. The output power of the power estimation unit (i.e. power signal) is designed to follow any rapid changes in its input. When the desired signal contained in its input fades away, the power signal should decay slowly so that the weight of the adaptive filter of the adaptive noise cancellation filtering circuit is not updated wrongly when the desired signal is present.

The silence detector unit detects whether the sounds received by the microphones correspond to a "silent" signal, and is adapted to generate the first output signal accordingly. In other words, the silence detector unit detects the case when there is no strong background noise, interference signal or any desired signal and generates the first output signal indicating when such mentioned noise or signal are not present. When a "silent" signal is indicated by the first output signal, it means that only random circuit noise such as channel noise is present.

The signal detector unit detects whether the desired signal, in particular desired speech, is present, and is adapted to generate the second output signal accordingly. The second output signal provides information on whether the desired speech or interference noise, or a combination of both the desired speech and interference noise are present.

The ANCF controller unit is adapted to receive the first output signal and the second output signal to determine the characteristic of the input signals, and to use the information thereof to determine an appropriate step size value to be used for updating the weights or coefficients of the adaptive filter(s) used in the adaptive noise cancellation filtering circuit. The ANCF controller unit is adapted to generate the ANCF control signal which corresponds to the appropriate step size value.

Similarly, the SFS controller unit is adapted to receive the first output signal and the second output signal to determine the characteristic of the input signals and to use the information thereof to determine an appropriate step size value to be used for updating the weights or coefficients of the FIR filters of the SFS. The SFS controller unit is adapted to generate the SFS control signal which corresponds to the appropriate step size value.

In the preferred embodiment of the invention, the adaptive noise cancellation controller unit further comprises a PP controller unit which is adapted to receive the first and second output signal to determine the characteristic of the input signals and to use the information thereof to determine an appropriate step size value for updating the weights or coefficients of the FIR filter of the PP filtering circuit.

The ANCF controller unit, the SFS controller unit and the PP controller unit use a counter based method combined with an adaptive update method to get a stable control on the step size values of the filters. Therefore, a smooth control signal from the controllers is ensured even under uncertain system perturbation. This prevents the adaptive noise canceling microphone system from becoming unstable, and short uncertain perturbation will not affect the performance of the system. Furthermore, since the step size values of the filters are not fixed but change in an adaptive manner, the weights of the filters are always obtained at the optimal value even when the input signals change.

According to the invention, a first amplifier and a second amplifier are used to amplify the signals resulting from the sounds picked up by the microphones. The amplified signals are filtered by a first low pass filter and a second low pass filter to generate analog amplified and filtered signals. The amplified and filtered signals are converted to digital signals using a first Analog-to-Digital (A/D) Converter and a second Analog-to-Digital (A/D) converter, the digital signals are the first and second input signals which are inputs to the SFS.

The output of the PP filtering circuit is the digital result signal, which is in digital form. To use the digital result output in most analog devices, such as speakers, an Analog-to-Digital (A/D) converter is used to convert the digital result signal into an analog signal, thereby generating a result signal output. The result signal output, which is in analog form, can then be received by an analog input device, for example, speaker.

Other objects, features and advantages according to the invention will be presented in the following detailed description of the illustrated embodiments when read in conjunction with the accompanying drawings.

DETAILED DESCRIPTION OF THE PREFERRED EMBODIMENTS OF THE INVENTION

Figure 1:
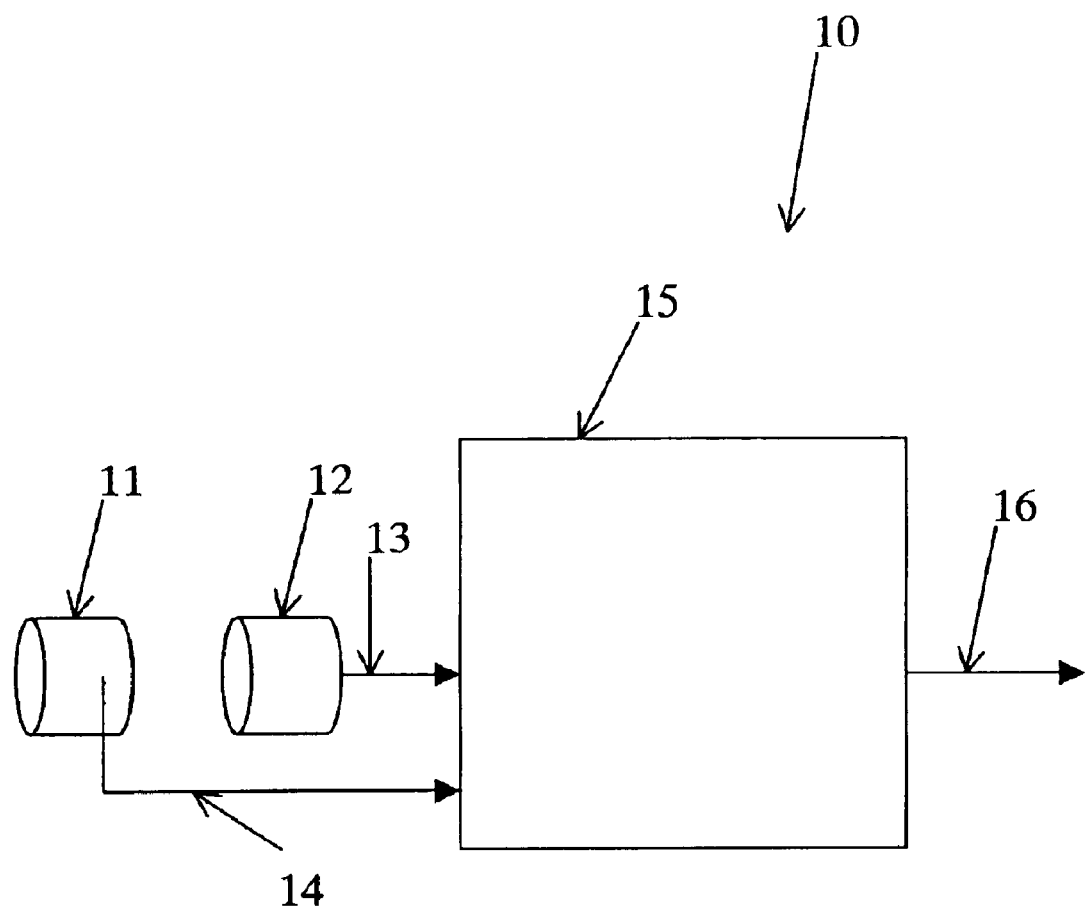
FIG. 1 shows the block diagram of an adaptive noise cancellation microphone system, comprising a processing unit according to the invention.

FIG. 1 shows the block diagram of the adaptive noise canceling microphone system 10 according to the invention. The system 10 comprises a first microphone 11, a second microphone 12 and a processing unit 15. The processing unit 15 receives signals 13,14 resulting from sounds received by the microphones 11,12. An output result signal 16 is generated by the processing unit 15.

The two microphones 11,12 are arranged at a predefined distance, preferably between 2 cm and 3 cm, from each other so as to form a 3-dimensional beam for receiving sounds using digital signal processing techniques. The forming of the 3-dimensional beam is controlled by a signal forming system (described later) in the processing unit 15.

Figure 2:
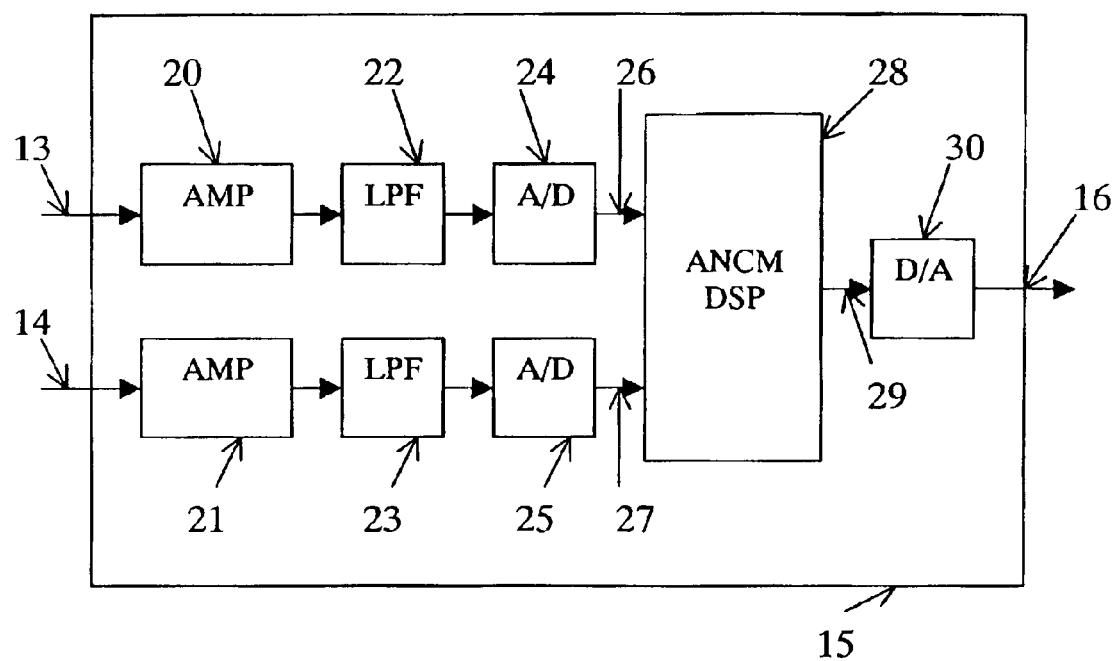
FIG. 2 shows the block diagram of the processing unit shown in FIG. 1 according to the invention.

A detailed block diagram of the processing unit 15 is shown in FIG. 2. The signals 13,14 generated by the microphones 11,12 are amplified in a first amplifier 20 and a second amplifier 21, respectively. The amplified signals are filtered in a first and second low pass filter 22,23 to remove any high frequency components. The amplified and filtered signals are subsequently converted to digital signals 26,27 using a first and second Analog-to-Digital (A/D) converters 24,25 to be processed by an adaptive noise canceling system 28.

The digital signals 26,27 are received as first and second input signals 26,27 by the adaptive noise canceling system 28 for processing to remain the desired signal and cancel the noise or interference signals. The output of the adaptive noise canceling system 28 is a digital result signal 29. The digital result signal 29 can be further processed by other systems, or converted to an analog signal for driving output devices like speakers. According to the invention, the digital result signal 29 is converted to an analog signal, known as the result signal output 16, using a Digital-to-Analog (A/D) converter 30.

Figure 3:
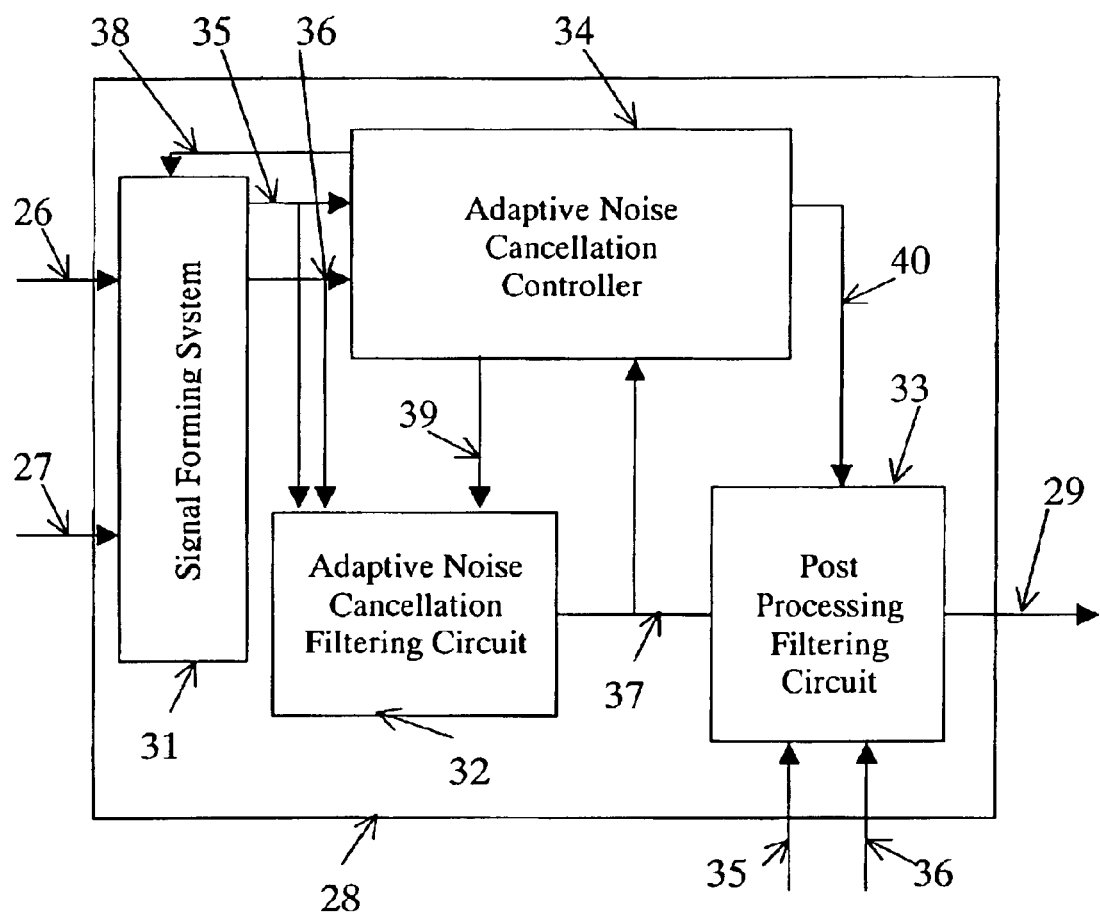
FIG. 3 shows the detail block diagram of the adaptive noise canceling system according to the invention.

FIG. 3 shows the block diagram of the adaptive noise canceling system 28 according to the preferred embodiment of the invention. The adaptive noise canceling system 28 comprises of the signal forming system (SFS) 31, an adaptive noise cancellation filtering circuit 32, a post processing (PP) filtering circuit 33 and an adaptive noise cancellation microphone (ANCM) controller 34.

The SFS 31 is adapted to receive the first input signal 26, the second input signals 27 and a SFS control signal 38 to form a speech enhanced signal 35 and a speech nulled signal 36. The speech enhanced signal 35 represents sounds received with the desired signal enhanced, whereas the speech nulled signal 36 represents the sounds received with the desired signal suppressed. In other words, the speech nulled signal 36 represents noise or interference signal.

The adaptive noise cancellation filtering circuit 32 is adapted to receive the speech enhanced signal 35, the speech nulled signal 36 and an adaptive noise canceling filter (ANCF) control signal 39, and to generate an output filtered signal 37. The PP filtering circuit 33 is adapted to receive the speech enhanced signal 35, the speech nulled signal 36, the output filtered signal 37 and a PP control signal 40, and to generate the digital result signal 29.

The adaptive noise cancellation controller 33 is adapted to receive the speech enhanced signal 35, the speech nulled signal 36 and the output filtered signal 37, and to generate the SFS control signal 39, the ANCF control signal 38 and the PP control signal 40 for updating coefficients of at least one filters used in the SFS 31, the adaptive noise cancellation filtering circuit 32 and the post processing filtering circuit 33, respectively.

The ANCM controller 34 updates the coefficients of the at least one filters in the SFS 31, the adaptive noise cancellation filtering circuit 32 and the post processing filtering circuit 33 by controlling the step size value of the filters used in them.

Figure 4:
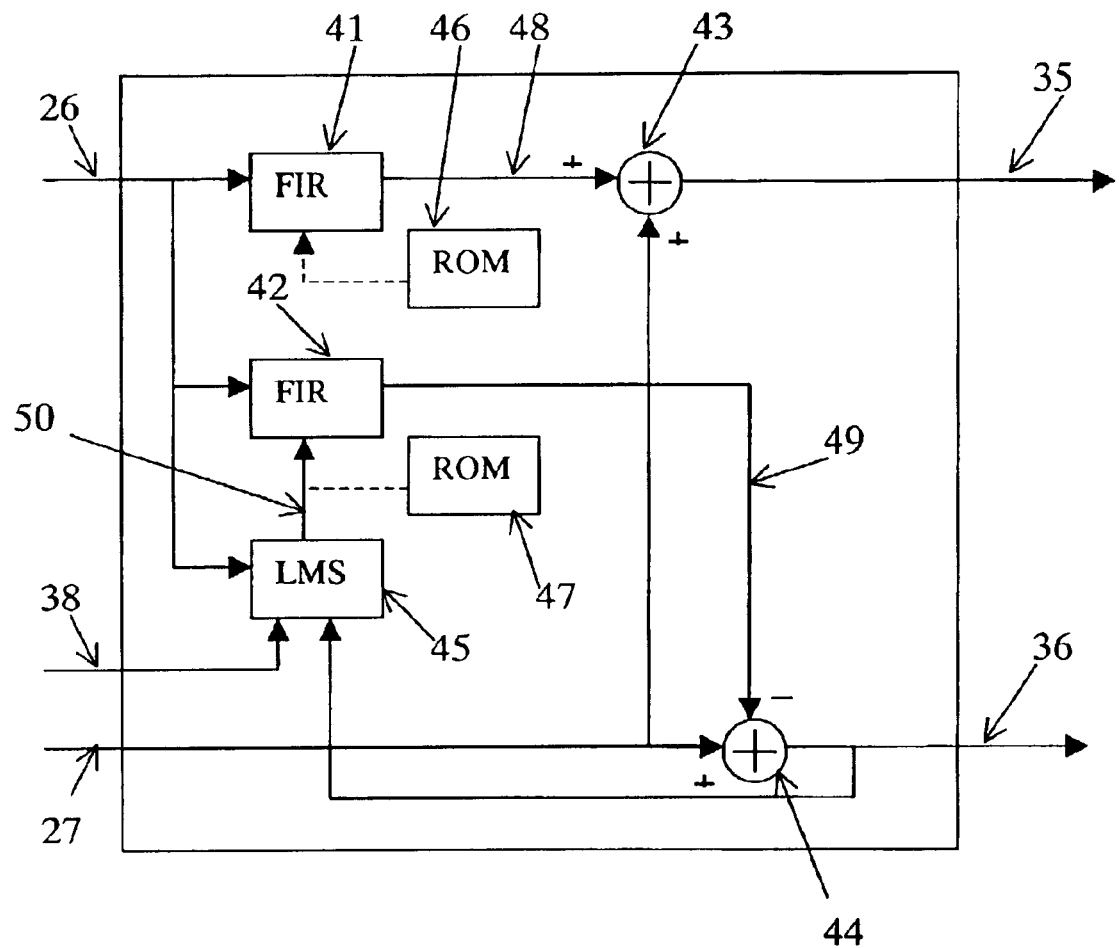
FIG. 4 shows the detail block diagram of the signal forming system according to the invention.

The detail implementation of the SFS 31 is shown in FIG. 4. The SFS 31 comprises a first and second finite impulse response (FIR) filter 41,42, and a first and second adder 43,44. The first and second FIR filters 41,42 are adapted to receive the first input signal 26 and to generate a first and second FIR filtered signal 48,49, respectively. The first and second FIR filters 41,42 are used to approximate the desired signal components in the first input signal 26 which corresponds to the desired signal components in second input signal 27, resulting the first and second filtered signals 48,49.

The first adder 43 adds the first filtered signal 48 to the second input signal 27 to produce the speech enhanced signal 35, which is the sounds received with the desired signal enhanced. The second filtered signal 49 is subtracted from the second input signal 27 by the second adder 44 to form the speech nulled signal 36.

In the preferred embodiment of the invention, the coefficients of the first and second FIR filters 41,42 are updated by a Least Means Squared (LMS) algorithm block 45. The LMS algorithm block 45 is adapted to receive the first input signal 26, with the SFS control signal 38 and the speech nulled signal 36 as reference, to update coefficients of the FIR filters 41,42. The coefficients of the FIR filters 41,42 are updated using the following equation:

$$W(n+1) = W(n) + \frac{m_{sfs}(n)X(n)e(n)}{|X(n)|^2} \quad (1)$$

wherein
W(n) is the weight of the FIR filters 41,42,
$m_{sfs}(n)$ is the step size value of the FIR filter 41,42,
X(n) is the input signal 26, and
e(n) is the output of the second adder 44 or the speech nulled signal 36.

The weights or coefficients of the FIR filters 41,42 change adaptively according to the characteristic of the desired signal contained in the input signals 26,27.

The coefficients for the FIR filters 41,42 may be pre-calculated, and such pre-calculated coefficient information may be stored in a first and second Read Only Memory (ROM) 46,47 in an alternative embodiment. The information stored in the first and second ROM 46,47 can then be loaded and used as the weights or coefficients for the first and second FIR filters 41,42, respectively, according to the user's preference. In such a case, the LMS block 45 is no longer needed.

Figure 5:
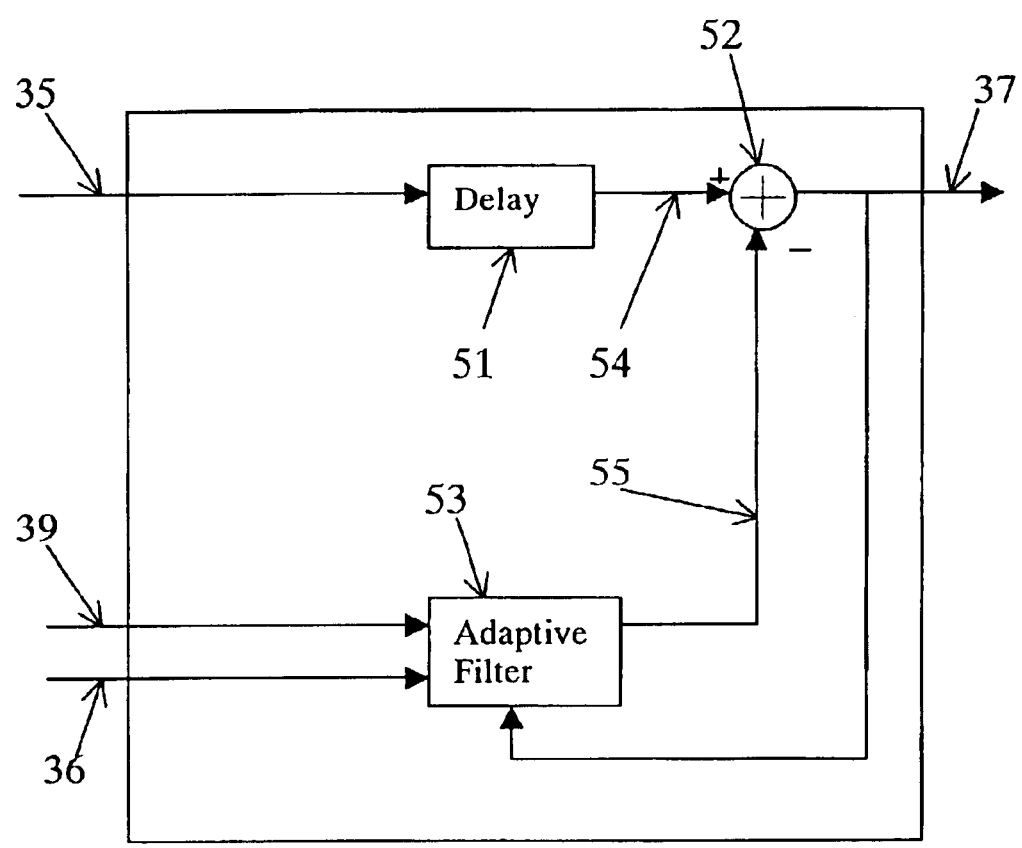
FIG. 5 shows the detail block diagram of the adaptive noise cancellation filtering circuit according to the invention.

FIG. 5 shows an implementation of the adaptive noise cancellation filtering circuit 32 according to the invention.

The adaptive noise cancellation filtering circuit 32 comprises a delay circuit 51, an adder 52 and an adaptive filter 53. The speech enhanced signal 35 is delayed a predetermined number of samples by a delay circuit 51 to generated a delayed signal 54. The adaptive filter 53 is adapted to receive and estimate the component of noise based on the speech nulled signal 36 and to generate a filtered signal 55 representing the noise components. The filtered signal 55 is subtracted from the delayed signal 54 by the adder 52 to generate an error signal 37 which is also the output filtered signal 37.

The adaptive filter 53 is also adapted to receive the error signal 37 as feedback information, and the ANCF control signal 39 for controlling the step size value for proper updating of its filter coefficients.

Figure 6:
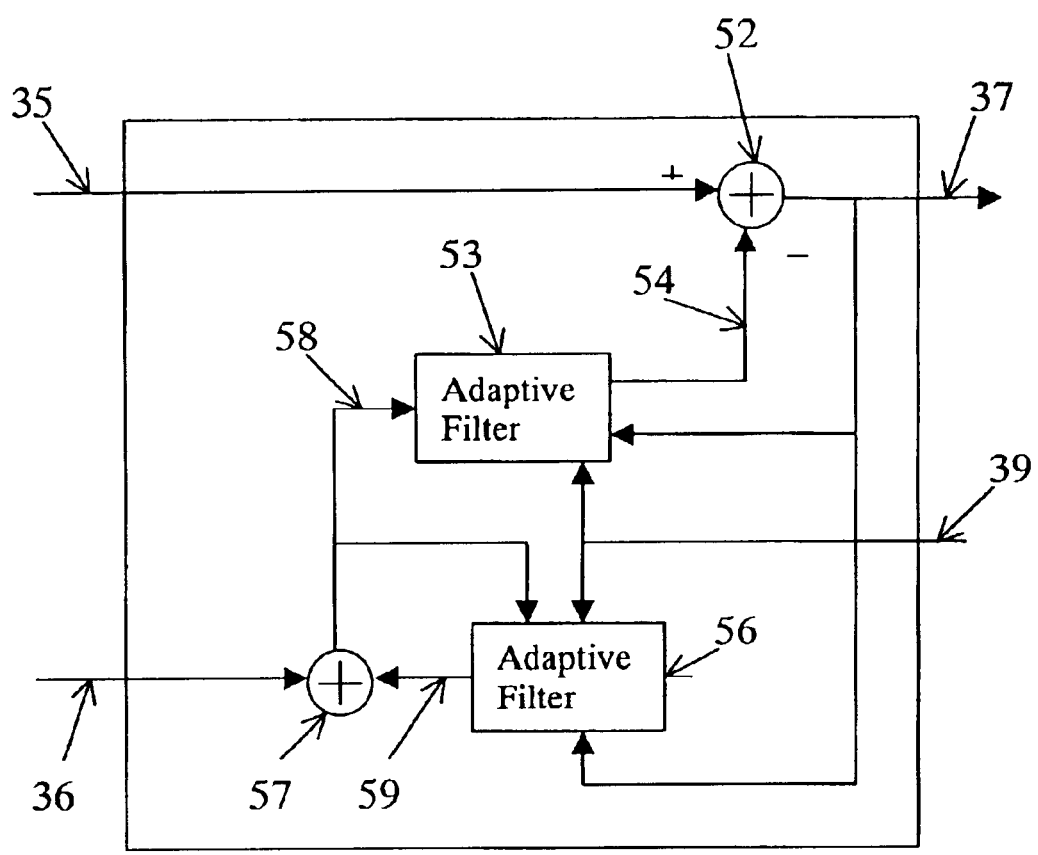
FIG. 6 shows the detail block diagram of the adaptive noise cancellation filtering circuit according to the preferred embodiment of the invention.

FIG. 6 shows the implementation of the adaptive noise cancellation filtering circuit 32 using a cross-talk configuration according to the preferred embodiment of the invention. The cross-talk configuration comprises of the adaptive filter 53, the adder 52, an additional adaptive filter 56 and an additional adder 57. The adder receives the speech enhanced signal 35 and the filtered signal 55 to generate the output filtered signal or the error signal 37. The additional adder 57 is adapted to receive the speech nulled signal 36 and an additional filtered signal 59, and to generate an additional error signal 58. The additional filtered signal 59 is generated by the additional adaptive filter 56. The additional adaptive filter 56 is also adapted to receive the error signal 37 as input and the additional error signal 58 as feedback information. Similarly, the adaptive filter 53 is adapted to receive the additional error signal 58 as input and the error signal 37 as feedback information. The step size value for updating the coefficients of both the adaptive filters 53,56 are provided by the ANCF control signal 39.

Figure 7:
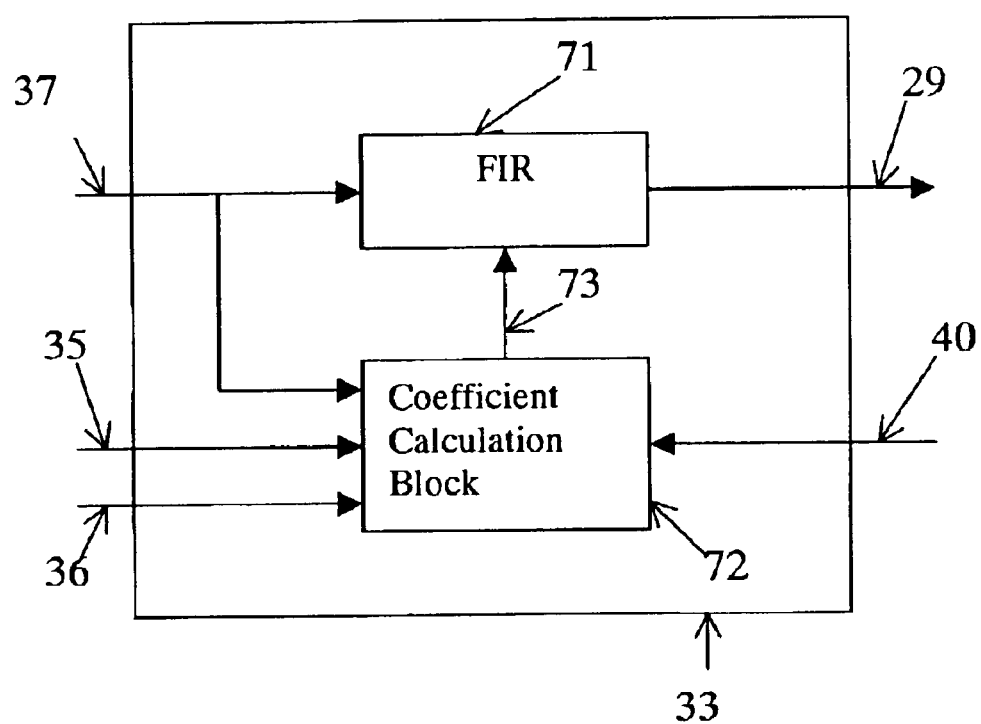
FIG. 7 shows the detail block diagram of the post processing filtering circuit according to the preferred embodiment of the invention.
Figure 8:
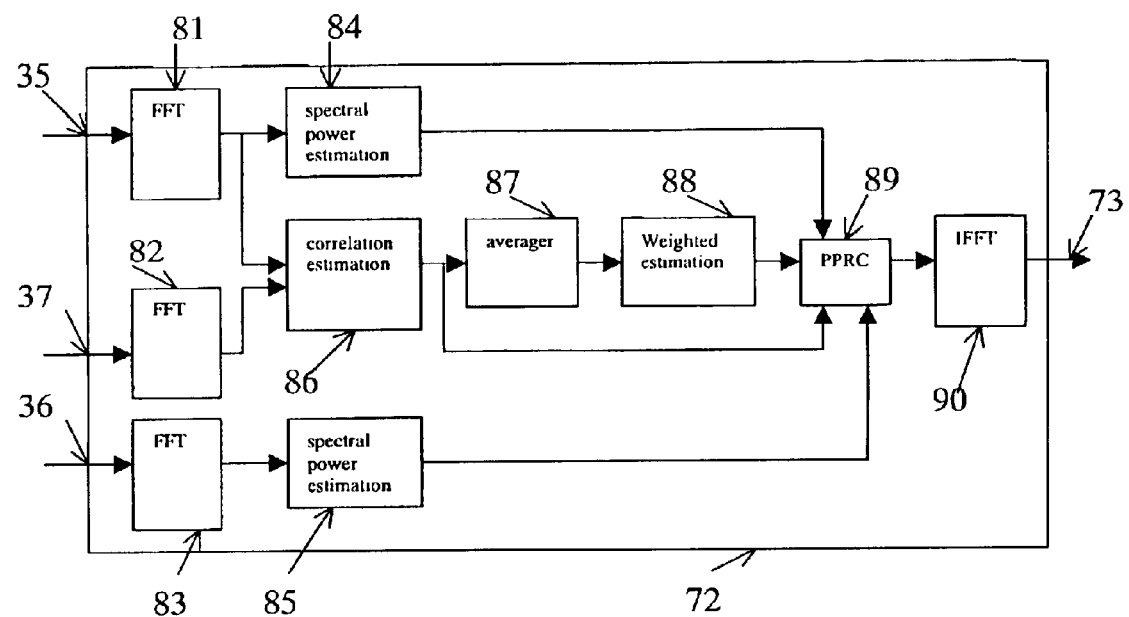
FIG. 8 shows the detail block diagram of the coefficient calculation block of the post processing filtering circuit according to the preferred embodiment of the invention.

FIG. 7 shows the detailed block diagram of the PP filtering circuit 33. The PP filtering circuit 33 comprises a FIR filter 71 and a coefficient calculation block 72. The FIR filter 71 is adapted to receive the output filtered signal 37 to further reduce any noise present in the output filtered signal 37, and to generate the digital result signal 29. The coefficients for the FIR filter 71 are updated by the coefficient calculation block 72. The coefficient calculation block 72 is adapted to receive the speech enhanced signal 35, the speech nulled signal 36 and the output filtered signal 37 as references, together with the PP control signal 40 as the step size value, and to generate a coefficient signal 73 representing the coefficients of the FIR filter 71. The detailed implementation of the coefficient calculation block 72 can be summarized in FIG. 8.

The speech enhanced signal 35, speech nulled signal 36 and output filtered signal 37 are transformed by each separate Fast Fourier Transform (FFT) unit 81,82,83 into their respective frequency domain, represented by m1(k), m2(n) and e(k), respectively. The signals m1(k) and m2(n) are received by two separate spectral power estimation units 84,85 for generating corresponding power signals $P_{m1}(k)$ and $P_{m2}(k)$ using the following equations:

$$P_{m1}(k)=aP_{m1}(k-1)+(1-a).m1(k)\times m1\cdot(k) \qquad (2)$$

$$P_{m2}(k)=aP_{m2}(k-1)+(1-a).m2(k)\times m2\cdot(k) \qquad (3)$$

wherein a is the forgetting factor for the power computation, and the operator * denotes the complex conjugate.

The signals m1(k) and e(k) are also used to estimate the cross-correlation function $P_{m1e}(k)$ in the correlation estimation unit 86 using the following equations:

$$P_{m1e}(k)=aP_{m1e}(k-1)+(1-a).m1(k)\times e\cdot(k) \qquad (4)$$

The average correlation function $AP_{m1e}(k)$ is further obtained in an averager unit 87 using the following equation:

$$AP_{mle}(j) = \sum \frac{P_{me}(k)}{L} \qquad (5)$$

wherein for all k in the FFT block, and L is the length of the FFT block. The signal $AP_{m1e}(k)$ is then used to generated a weight signal $A_{me}(j)$ in a weighted estimation unit 88:

$$A_{me}(j) = \frac{a}{(AP_{mle}(j) + b)^c} \qquad (6)$$

wherein a, b and c are predefined positive constants. A post processing response calculator (PPRC) 89 is used to determine the coefficients for the FIR filter 71 using the following equation:

$$F(k) = \frac{P_{mle}(k)}{(P_{mle}(k) + A_{me}(j) \times P_{m2}(k))} \qquad (7)$$

which is subsequently transformed back to the time domain by an Inversed FFT unit 90 to obtain the coefficient signal 73 for the FIR filter 71.

Figure 9:
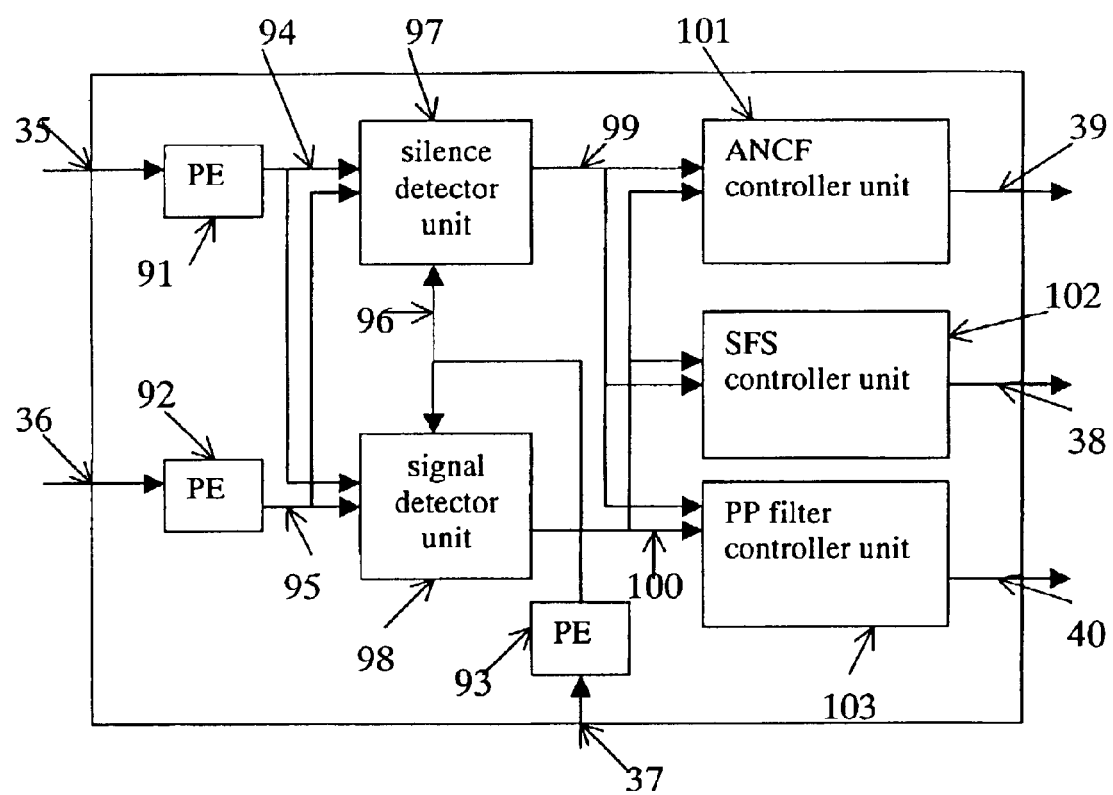
FIG. 9 shows the detail block diagram of the adaptive noise cancellation controller according to the preferred embodiment of the invention.

FIG. 9 shows the block diagram of the ANCM controller 34 according to the preferred embodiment of the invention. The ANCM controller 34 comprises three power estimator units 91,92,93, a silence detector unit 97, a signal detector unit 98, an adaptive noise canceling filter (ANCF) controller unit 101, a SFS controller unit 102 and a PP filter controller unit 103.

The three power estimator units 91,92,93 are adapted to receive and to estimate the power of the three signals 35,36,37. The outputs of the power estimator are three power signals 94,95,96. The power signals 94,95,96 are received as inputs by both the silence detector unit 97 and the signal detector unit 98. The silence detector unit 97 is adapted to generate a first output signal 99, and the signal detector unit 98 is adapted to generate a second output signal 100. The ANCF controller unit 101 is adapted to receive both the first and second output signal 99,100 and to generate the ANCF control signal 39. Similarly, the SFS controller unit 102 and the PP filter controller unit 103 are adapted to receive the first and second output signal 99,100 and to generate the SFS control signal 38 and the PP control signal 40, respectively.

The ANCF control signal 39, the SFS control signal 38 and the PP control signal 40 are used to update the step size value, and hence the coefficients of the filters used in the SFS 31, the adaptive noise canceling filtering circuit 32 and PP filtering circuit 33, respectively.

The detail implementation of each of the unit of the ANCM controller is illustrative from FIG. 10 to FIG. 15.

Figure 10:
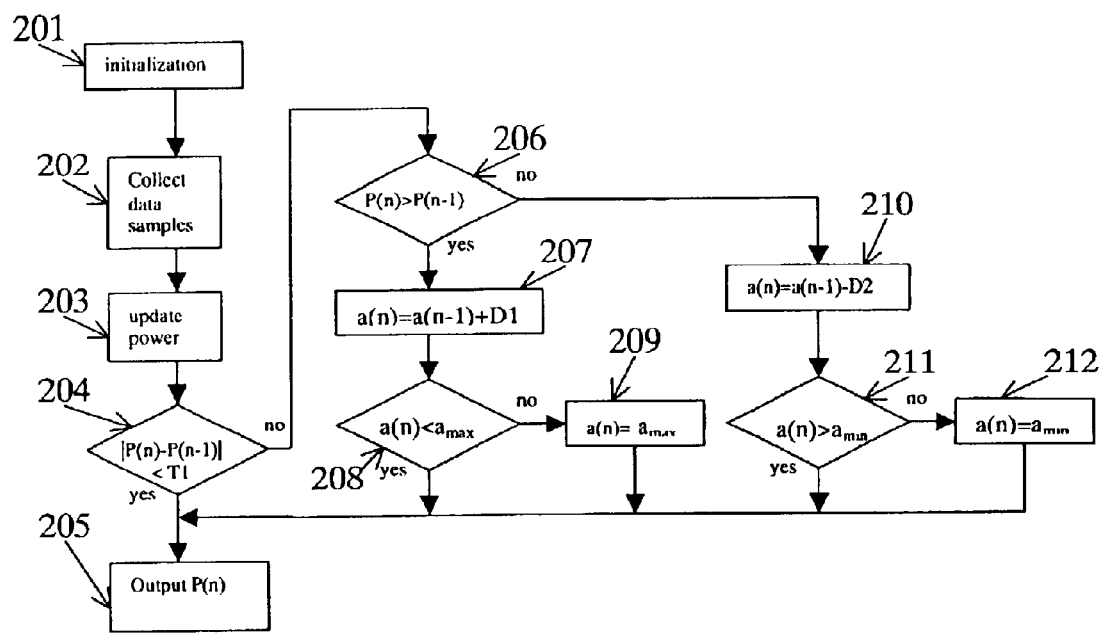
FIG. 10 shows the flow diagram of a power estimator unit according to the invention.
Figure 11:
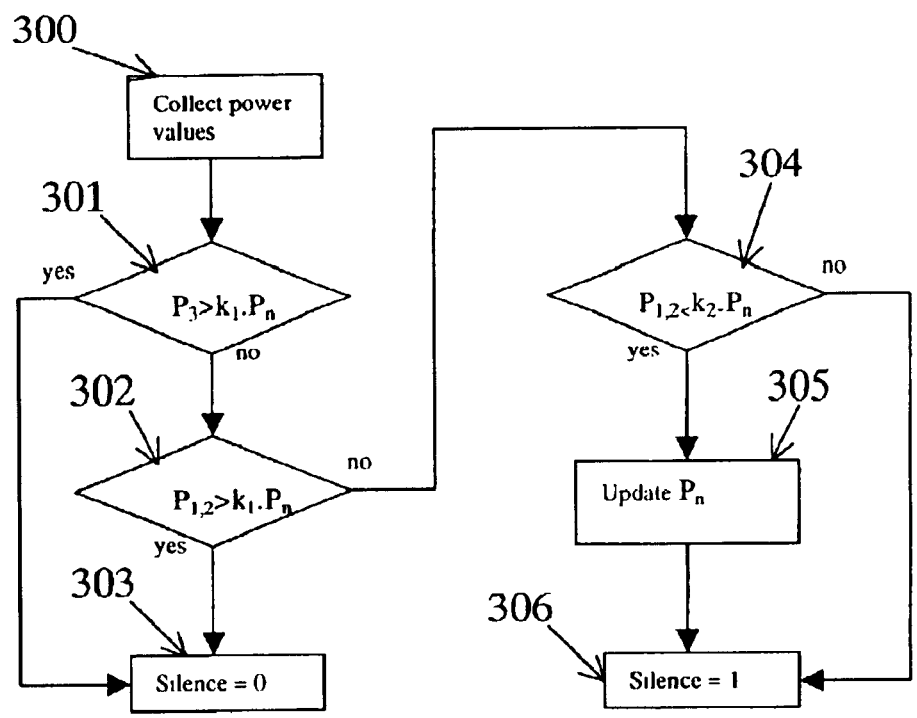
FIG. 11 shows the flow diagram of the silence detector unit according to the invention.

FIG. 10 shows a flow chart of one of the power estimator units 91,92,93. At an initialization step 201, the initial power of the signals 35,36,37 are initialized to zero:

$$p_1(n),p_2(n),p_3(n)=0 \qquad (8)$$

wherein $p_1(n)$, $p_2(n)$ and $p_3(n)$ are the power of the signals 35,36,37, respectively, corresponding to the power signals 94,95,96.

Similarly, the initial power update forgetting factors of the power estimators 91,92,93 are also initialized to some nonzero value, such as 0.5:

$$a_1(n),a_2(n),a_3(n)=0.5 \qquad (9)$$

wherein $a_1(n)$, $a_2(n)$ and $a_3(n)$ are the power update forgetting factors of power estimators 91,92,93, respectively. The minimum value of the power update forgetting factors is $a_{min}$ and the maximum value is $a_{max}$.

After the initialization step 201, the signals 35,36,37 are collected at step 202. The power of each of the input signals 35,36,37 are then updated in step 203 using the following formula:

$$p(n)=(1-a(n))*p(n-1)+a(n)*|x(n)|^2 \tag{10}$$

wherein $x(n)$ is any of the signals 35,36,37, $p(n)$ is the current power of any of the input signals $p_1(n)$, $p_2(n)$ or $p_3(n)$, and $p(n-1)$ is the previous power.

In step 204, the value of the current power $P(n)$ is compared with a value of the previous power $P(n-1)$ before updating to determine if the power $P(n)$ of the corresponding input signal is stationary. The comparison of the current power $P(n)$ and previous power $P(n-1)$ is performed using the following formulae:

$$D_p=|p(n)-p(n-1)| \tag{11}$$

$$D_p<T_1 \tag{12}$$

wherein $T_1$ is a parameter which is used to determine whether the estimated signal power is stable. When $D_p$ is smaller than $T_1$, it means that the power $P(n)$ of the input signal is substantially stationary. In this case, the power $P(n)$ is generated as the output power of the signal in step 205.

When $D_p$ is greater than $T_1$, it means that the power of the input signal has large changes between the current power $P(n)$ and previous power $P(n-1)$, and the power estimator unit then compares the power values in step 206, using the following:

$$p(n)>p(n-1) \tag{13}$$

If $p(n)$ is greater than $p(n-1)$, the power estimator unit updates the power updating factor $a(n)$ in step 207 using the following formula:

$$a(n)=a(n-1)+D_1 \tag{14}$$

wherein $a(n)$ is the current power updating factor $a_1(n)$, $a_2(n)$, $a_3(n)$ of any of the power estimator unit 91,92,93, $a(n-1)$ is the previous power updating factor, and $D_1$ is a step size parameter for updating the power updating factor $a(n)$.

The updated power updating factor $a(n)$ is further compared in step 208 to determine if it exceeds a maximum value:

$$a(n)<a_{max} \tag{15}$$

wherein $a_{max}$ is the maximum allowable value of $a(n)$. If $a(n)$ is smaller than $a_{max}$, the power $p(n)$ is generated as the output power in step 205. If $a(n)$ is greater than $a_{max}$, then $a(n)$ is assigned the value of $a_{max}$ in step 209 and the power $p(n)$ is generated as the output power in step 205.

If $p(n)$ is determined to be smaller than $p(n-1)$ during comparison in step 206, the power estimator unit updates the power updating factor $a(n)$ in step 210 using the following formula:

$$a(n)=a(n-1)-D_2 \tag{16}$$

and determines in step 211 if $a(n)$ is greater $a_{min}$:

$$a(n)>a_{min} \tag{17}$$

wherein $D_2$ is another step size parameter for updating the power updating factor $a(n)$, and $a_{min}$ is a minimum allowable value of $a(n)$. If $a(n)$ is greater than $a_{min}$, the power $p(n)$ is generated as the output power in step 205. If $a(n)$ is smaller than $a_{min}$, then $a(n)$ is assigned the value of $a_{min}$ in step 212 and the power $p(n)$ is generated in step 205.

The power $p(n)$ generated from step 205 is used as the output power for the silence detector unit 97 and the signal detector unit 98. The silence detector unit 97 receives the power signals $p_1(n)$, $p_2(n)$ and $p_3(n)$ 94,95,96 as inputs from the respective power estimator units 91,92,93 in step 300 of the flow chart shown in FIG. 11.

In step 301, the power signal $p_3(n)$ 96 from the power estimator unit 93 corresponding to the input signal 37 is compared with the noise power $p_n(n)$:

$$p_3(n)>k_1.p_n(n) \tag{18}$$

wherein $k_1$ is a threshold value used to detect "silence". If $p_3(n)$ is greater than $k_1.p_n(n)$, the "silence" is set to "0" in step 303, indicating that "silence" is not detected, and interference signal and/or desired signal is present.

If $p_3(n)$ is smaller than $k_1.p_n(n)$, the silence detector unit checks if both $p_1(n)$ and $p_2(n)$ are greater than $k_1.p_n(n)$ in step 302:

$$p_1(n)>k_1.p_n(n) \tag{19}$$

$$p_2(n)>k_1.p_n(n) \tag{20}$$

If both $p_1(n)$ and $p_2(n)$ are greater than $k_1.p_n(n)$, then "silence" is set to "0" in step 303, else it checks if both $p_1(n)$ and $p_2(n)$ are smaller than $k_2.p_n(n)$ in step 304:

$$p_1(n)<k_2.p_n(n) \tag{21}$$

$$p_2(n)<k_2.p_n(n) \tag{22}$$

wherein $k_2$ is another threshold value used to detect "silence". If both $p_1(n)$ and $p_2(n)$ are smaller than $k_2.p_n(n)$, then the noise power $p_n(n)$ is updated in step 305 using the following formula:

$$p_n(n) = dp_n(n-1) + \frac{(1-d) \cdot (p_1(n) + p_2(n))}{2} \tag{23}$$

wherein $d$ is a fixed parameter which can be selected as 0.9999 for smoothing the background power value. The "silence" is set to "1", indicating that there are no signal present. If in step 304, either one or both of $p_1(n)$ and $p_2(n)$ are greater than $k_2.p_n(n)$, the "silence" is set to "1" directly in step 306 without updating the value of the noise power $p_n(n)$.

Figure 12:
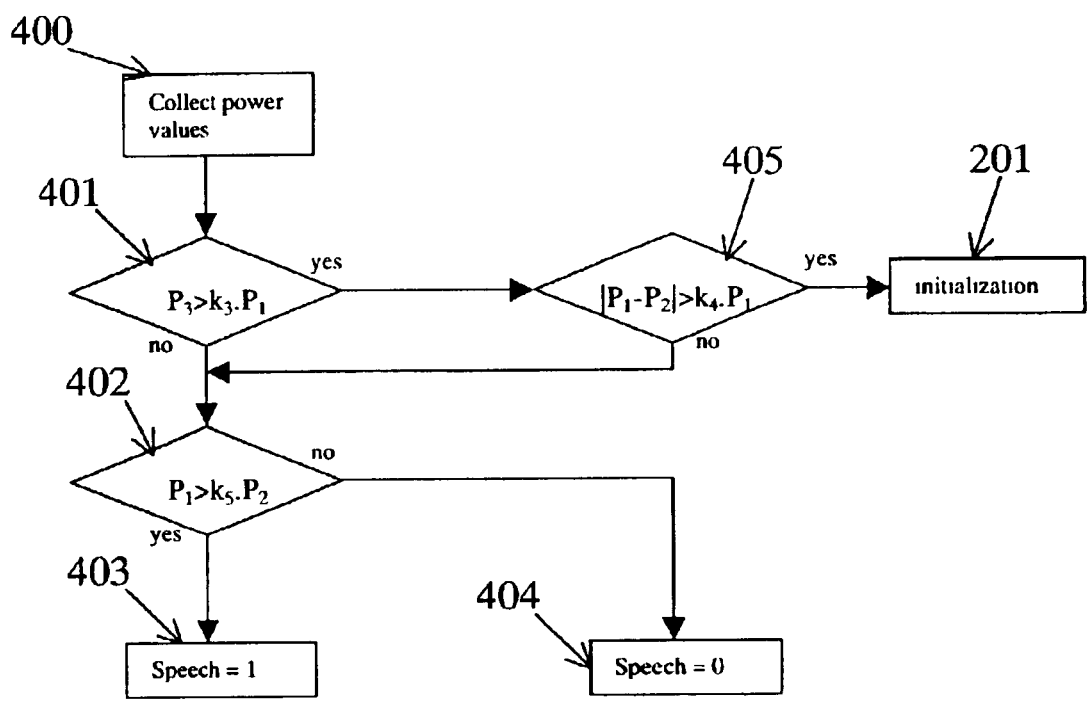
FIG. 12 shows the flow diagram of the signal detector unit according to the invention.

FIG. 12 shows a flow chart of the signal detector unit 98 for also receiving the power signals $p_1(n)$, $p_2(n)$ and $p_3(n)$ 94,95,96 as inputs from the respective power estimator units 91,92,93 in step 400.

In step 401, the power signal $p_3(n)$ is compared with $p_1(n)$:

$$p_3(n)>k_3.p_n(n) \tag{24}$$

wherein $k_3$ is a first threshold value for detecting the desired signal. If $p_{3(n)}$ is smaller than $k_3.p_1(n)$, then the signal detector unit determines in step 402 if:

$$p_1(n)>k_5.p_2(n) \tag{25}$$

wherein $k_5$ is a second threshold value for detecting desired signal. If $p_1(n)$ is greater than $k_5.p_2(n)$, the "signal" is set to "1" in step 403, indicating that desired signal is present. If $p_1(n)$ is smaller than $k_5.p_2(n)$, the "signal" is set to "0" in step 404, indicating that desired signal is not present.

If in step 401, $p_{3(n)}$ is greater than $k_3 \cdot p_1(n)$, then the signal detector unit determines further in step 405 if:

$$|p_1(n) - p_2(n)| < k_4 \cdot p_1(n) \tag{26}$$

wherein $k_4$ is a third threshold value for detecting the desired signal. If $|p_1(n) - p_2(n)|$ is smaller than $k_4 \cdot p_1(n)$, the ANCM controller 34 returns to the initialization state in step 201, and all system variables are initialized to the initial values. Otherwise the controller 34 proceeds to step 402.

The output of the silence and signal detector units 97,98 are the values of "silence" and "signal", respectively. Knowing the values of "silence" and "signal" enables one to determine if the signal contained by the sounds received comprises of desired signal, interference signal or noise, or a combination of them.

The outputs from both the silence detector unit 97 and the signal detector unit 98 are received by the ANCF controller 39, the SFS controller 38 and the PP filter controller 40.

Figure 13:
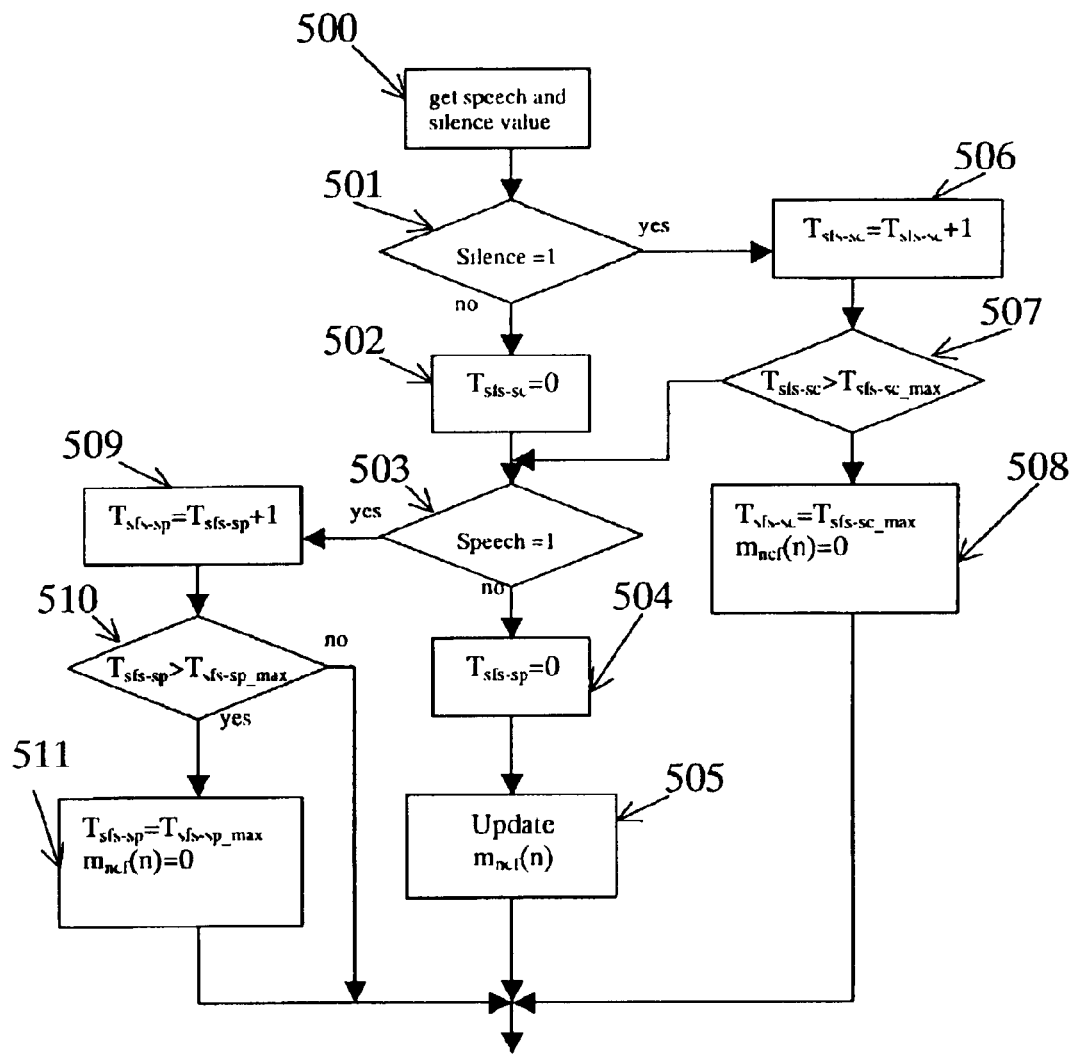
FIG. 13 shows the flow diagram of the signal forming system controller unit according to the invention.

The flow chart of the SFS controller 38 is shown in FIG. 13. In step 500, the outputs from the silence and signal detector units 97,98 are received by the SFS controller 38. In step 501, the value of "silence" is determined if it is set at "1". If "silence" is not set at "1", i.e. set at "0", then $T_{sc}$ is initialized to 0 in step 502:

$$T_{sfs-sc} = 0 \tag{27}$$

wherein $T_{sfs-sc}$ is a counter for determining "silence" in the SFS controller 38.

In step 503, the value of "speech" is determined if it is set at "1". If "speech" is not set at "1", then $T_{sfs-sp}$ is to 0 in step 504:

$$T_{sfs-sp} = 0 \tag{28}$$

wherein $T_{sfs-sp}$ is a counter for determining "speech" in the SFS controller 38. The step size parameter for the FIR filter of the SFS generated by the SFS controller 38 is the updated in step 505 using the following formula:

$$m_{sfs}(n) = (1-q) \cdot m_{sfs}(n-1) + q \tag{29}$$

wherein $m_{sfs}(n)$ is the step size parameter.

If "silence" is detected to be set at "1" in step 501, then $T_{sfs-sc}$ is increment by 1 in step 506:

$$T_{sfs-sc} = T_{sfs-sc} + 1 \tag{30}$$

and the incremented value of $T_{sfs-sc}$ is compared to see if it exceeds the maximum value $T_{sfs-sc\_max}$ in step 507:

$$T_{sfs-sc} > T_{sfs-sc\_max}. \tag{31}$$

If $T_{sfs-sc}$ is greater than $T_{sfs-sc\_max}$, $T_{sfs-sc}$ is set to $T_{sfs-sc\_max}$, and the output of the SFS controller 38, $m_{sfs}(n)$, is set to "0" in step 508. Else, the SFS controller 38 continues to determine the value of "speech" in step 503.

When the "speech" is set "1", $T_{sfs-sp}$ is increment by 1 in step 509:

$$T_{sfs-sp} = T_{sfs-sp} + 1 \tag{32}$$

and the incremented value of $T_{sfs-sp}$ is compared to see if it exceeds the maximum value $T_{sfs-sp\_max}$ in step 510:

$$T_{sp} > T_{sp\_max}. \tag{33}$$

If $T_{sfs-sp}$ is greater than $T_{sfs-sp\_max}$, $T_{sfs-sp}$ is set to $T_{sfs-sp\_max}$, and the output of the SFS controller 38, $m_{sfs}(n)$, is set to "0" in step 511. Else, the output, $m_{sfs}(n)$, remains unchanged.

Figure 14:
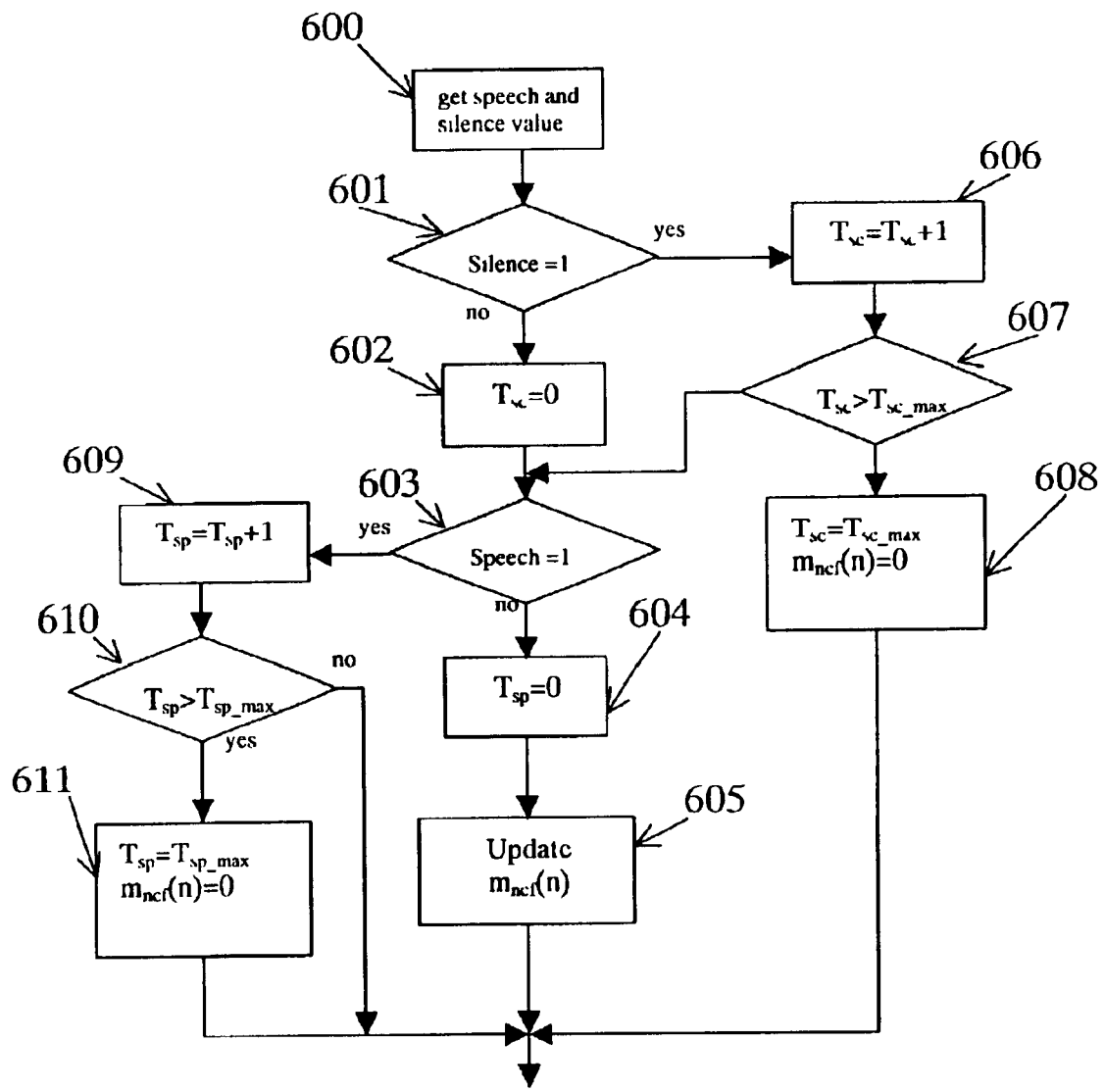
FIG. 14 shows the flow diagram of the adaptive noise cancellation filter controller unit according to the invention.

The flow chart of the ANCF controller 39 is shown in FIG. 14.

In step 600, the output from the silence and signal detector units 97,98 are received by the ANCF controller 39. In step 601, the value of "silence" is determined if it is set at "1". If "silence" is not set at "1", i.e. set at "0", then $T_{sc}$ is initialized to 0 in step 602:

$$T_{sc} = 0 \tag{34}$$

wherein $T_{sc}$ is a counter for determining "silence" in the ANCF controller 39.

In step 603, the value of "speech" is determined if it is set at "1". If "speech" is not set at "1", then $T_{sp}$ is to 0 in step 604:

$$T_{sp} = 0 \tag{35}$$

wherein $T_{sp}$ is a counter for determining "speech" in the ANCF controller 39. The step size parameter for the adaptive filter of the adaptive noise cancellation filtering circuit 32 generated by the ANCF controller 39 is the updated in step 605 using the following formula:

$$m_{ncf}(n) = (1-q) \cdot m_{ncf}(n-1) + q \tag{36}$$

wherein $m_{ncf}(n)$ is the step size parameter.

If "silence" is detected to be set at "1" in step 601, then $T_{sc}$ is increment by 1 in step 606:

$$T_{sc} = T_{sc} + 1 \tag{37}$$

and the incremented value of $T_{sc}$ is compared to see if it exceeds the maximum value $T_{sc\_max}$ in step 607:

$$T_{sc} > T_{sc\_max}. \tag{38}$$

If $T_{sc}$ is greater than $T_{sc\_max}$, $T_{sc}$ is set to $T_{sc\_max}$, and the output of the ANCF controller 39, $m_{ncf}(n)$, is set to "0" in step 608. Else, the ANCF controller 39 continues to determine the value of "speech" in step 603.

When the "speech" is set "1", $T_{sp}$ is increment by 1 in step 609:

$$T_{sp} = T_{sp} + 1 \tag{39}$$

and the incremented value of $T_{sp}$ is compared to see if it exceeds the maximum value $T_{sp\_max}$ in step 610:

$$T_{sp} > T_{sp\_max}. \tag{40}$$

If $T_{sp}$ is greater than $T_{sp\_max}$, $T_{sp}$ is set to $T_{sp\_max}$, and the output of the ANCF controller 39, $m_{ncf}(n)$, is set to "0" in step 611. Else, the output, $m_{ncf}(n)$, remains unchanged.

Figure 15:
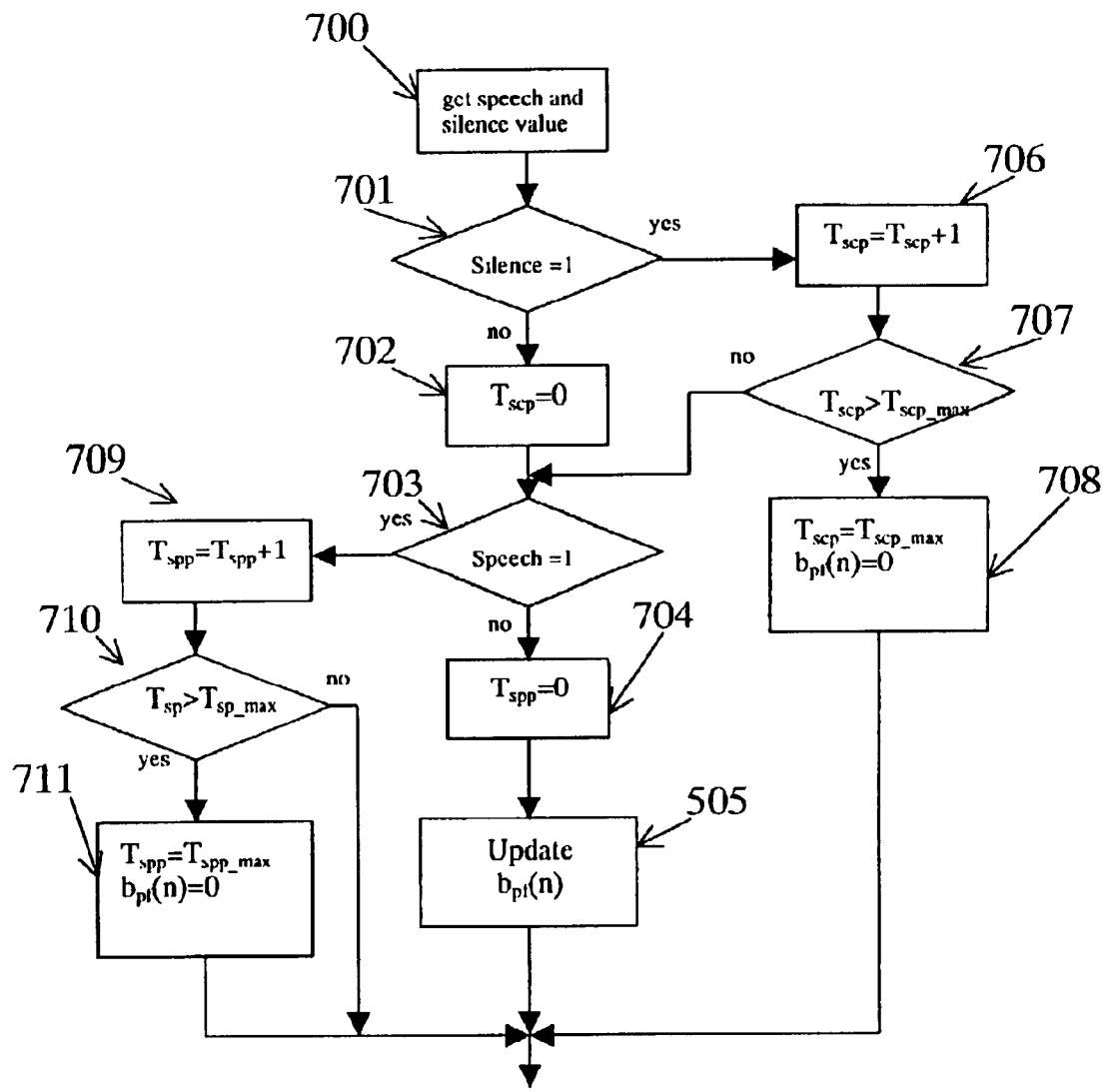
FIG. 15 shows the flow diagram of the post processing filter controller unit according to the preferred embodiment of the invention.

The flow chart of the PP filter controller 40 is shown in FIG. 15. Similarly, the output from the silence and signal detector units 97,98 are received by the PP filter controller 40 in step 700. In step 701, the value of "silence" is determined if it is set at "1". If "silence" is not set at "1", i.e. set at "0", then $T_{scp}$ is initialized to "0" in step 702:

$$T_{scp} = 0 \tag{41}$$

wherein $T_{scp}$ is a counter for determining "silence" in the PP filter controller 40.

In step 703, the value of "speech" is determined if it is set at "1". If "speech" is not set at "1", then $T_{spp}$ is to "0" in step 704:

$$T_{spp} = 0 \tag{42}$$

wherein $T_{spp}$ is a counter for determining "speech" in the PP filter controller 40. The step size parameter for a noise canceling filter generated by the PP filter controller 40 is the updated in step 705 using the following formula:

$$b_{ncf}(n)=(1-j)\cdot b_{ncf}(n-1)+j \quad (43)$$

wherein $b_{ncf}(n)$ is the step size parameter.

If "silence" is detected to be set at "1" in step 701, then $T_{scp}$ is increment by 1 in step 706:

$$T_{scp}=T_{scp}+1 \quad (44)$$

and the incremented value of $T_{scp}$ is compared to see if it exceeds the maximum value $T_{scp\_max}$ in step 507:

$$T_{scp}>T_{scp\_max}. \quad (45)$$

If $T_{scp}$ is greater than $T_{scp\_max}$, $T_{scp}$ is set to $T_{scp\_max}$, and the output of the PP filter controller 40, $b_{ncf}(n)$, is set to "0" in step 708. Else, the PP filter controller 40 continues to determine the value of "speech" in step 703.

When the "speech" is set "1", $T_{spp}$ is increment by 1 in step 709:

$$T_{spp}=T_{spp}+1 \quad (46)$$

sand the incremented value of $T_{spp}$ is compared to see if it exceeds the maximum value $T_{spp\_max}$ in step 710:

$$T_{spp}>T_{spp\_max}. \quad (47)$$

If $T_{spp}$ is greater than $T_{spp\_max}$, $T_{spp}$ is set to $T_{spp\_max}$, and the output of the PP filter controller 40, $b_{ncf}(n)$, is set to "0" in step 711. Else, the output, $b_{ncf}(n)$, remains unchanged.

While the embodiments of the invention have been described, they are merely illustrative of the principles of the invention. Other embodiments and configurations may be devised without departing from the spirit of the invention and the scope of the appended claims.

What is claimed is:

1. An adaptive noise canceling microphone system for extracting a desired signal, in particular a desired speech signal, comprising:
   two microphones being arranged at a predefined distance from each other;
   a signal forming system (SFS) being adapted to receive a first and second input signal resulting from sounds received by the two microphones,
      wherein an acoustical signal component in the first input signal is determined,
      wherein an acoustical signal component in the second input signal is determined,
      wherein the acoustical signal component in the first input signal is enhanced to generate a speech enhanced signal, and
      wherein the acoustical signal component in the second input signal is suppressed to generate a speech nulled signal;
   an adaptive noise cancellation filtering circuit being adapted to receive the speech enhanced signal and the speech nulled signal, wherein the noise in the speech enhanced signal is cancelled using the speech nulled signal as reference, thereby generating an output filtered signal representing the desired signal.

2. The adaptive noise canceling microphone system according to claim 1, further comprising a post processing filtering circuit for reducing noise from the output filtered signal, wherein the post processing filtering circuit is adapted to receive the output filtered signal, using the speech enhanced signal and the speech nulled signal as reference, and to generate a digital result signal representing the output filtered signal with noise reduced.

3. The adaptive noise canceling microphone system according to claim 2, further comprising an adaptive noise cancellation microphone (ANCM) controller for receiving the speech enhanced signal, the speech nulled signal and is the output filtered signal, the adaptive noise cancellation microphone (ANCM) controller being adapted to generate an adaptive noise cancellation filter (ANCF) control signal and an SFS control signal for updating coefficients of at least one filter of the SFS and adaptive noise cancellation filtering circuit, respectively, using the received speech enhanced signal, the speech milled signal and the output filtered signal.

4. The adaptive noise canceling microphone system according to claim 3, wherein the adaptive noise cancellation microphone controller is adapted to generate a post processing filter control signal for updating the coefficients of the at least one filter of the post processing filtering circuit.

5. The adaptive noise cancellation microphone system according to claim 4, wherein the adaptive noise cancellation controller comprises
   a power estimator unit being adapted to receive each of the speech enhanced signal, the speech nulled signal and the output filtered signal, and to generate a corresponding power signal to be received by a silence detector unit and a signal detector unit;
   the silence detector unit for detecting whether an acoustical signal is present in the speech enhanced signal input, the speech nulled signal and the output filtered signal, and being adapted to generate a first output signal which indicates whether the acoustical signal is present;
   a signal detector unit for detecting whether a desired signal is present in the speech enhanced signal, the speech nulled signal and the output filtered signal, and being adapted to generate a second output signal which indicates whether the desired signal is present;
   an adaptive noise cancellation filter controller unit being adapted to receive the first output signal and the second output signal to determine the characteristic of the first input signal and the second input signal, and to generate the ANCF control signal which represents an updated coefficient parameter for updating the coefficients of the at least one filter of the adaptive noise cancellation filtering circuit; and
   an SFS controller unit being adapted to receive the first output signal and the second output signal to determine the characteristic of the first input signal and the second input signal, and to generate the SFS control signal which represents an updated coefficient parameter for updating the coefficients of the at least one filter of the SFS.

6. The adaptive noise cancellation microphone system according to claim 5, wherein the adaptive noise cancellation controller further comprises a post processing filter controller unit, wherein the post processing filter controller unit is adapted to receive the first output signal and the second output signal to determine the characteristic of the first input signal and the second input signal, and to generate a post processing control signal which represents an updated coefficient parameter for updating the coefficients of at least one filter of the post processing filtering circuit.

7. The adaptive noise cancelling microphone system according to claim 3, wherein the SFS comprises a first FIR filter and a second FIR filter for receiving the first input signal, wherein the first FIR filter and the second FIR filter are adapted to determine the acoustical signal component in the first input signal, and to generate a first FIR filtered signal and a second FIR filtered signal, respectively, representing the acoustical signal component in the first input signal;

a first adder for adding the first FIR filtered signal to the second input signal, thereby generating the speech enhanced signal;

a second adder or subtracting the second FIR filtered signal from the second input signal, thereby generating the speech nulled signal.

8. The adaptive noise canceling microphone system according to claim 7, wherein the SFS further comprises a Least Means Squared (LMS) algorithm block, wherein the LMS algorithm block is adapted to receive the first input signal, the SFS control signal and the speech nulled signal, and to update the coefficients of the first and/or second FIR filters.

9. The adaptive noise canceling microphone system according to claim 7, wherein the SFS further comprises a first Read Only Memory (ROM) and a second Read Only Memory (ROM), wherein information representing the coefficients of the first FIR filter and the second FIR filter are stored in the first ROM and the second ROM, and the stored information in the ROMs are used as coefficients for the first FIR filter and the second FIR filter, respectively.

10. The adaptive noise canceling microphone system according to claim 3, wherein the adaptive noise cancellation filtering circuit comprises:

an adaptive filter being adapted to receive the speech nulled signal, and to generate a filtered signal representing noise in the first and second input signal; and an adder for subtracting the filtered signal from the speech enhanced signal, and generating an error signal;

wherein the ANCF control signal is used to update the coefficients of the adaptive filter, and wherein the error signal from the adder is used as feedback information to the adaptive filer.

11. The adaptive noise cancellation microphone system according to claim 10, further comprising a delay circuit arranged between the speech enhanced signal and the adder, wherein the delay circuit is adapted to receive and delay the speech enhanced signal, and to generate a delayed signal to the adder.

12. The adaptive noise cancellation microphone system according to claim 11, further comprising an additional, adder arranged between the speech nulled signal and the adaptive filter for subtracting an additional filtered signal of an additional adaptive filter from the speech nulled signal, and generating an additional error signal to the adaptive filter; and the additional adaptive filter being adapted to receive the error signal, and to generate the additional filtered signal representing an estimated component of the desired signal in the error signal, wherein the ANCF control signal is used to update the coefficients of the additional adaptive filter, and wherein the additional error signal is used as a feedback information to the additional adaptive filter.

13. The adaptive noise cancellation microphone system according to claim 10, further comprising an additional adder arranged between the speech nulled signal and the adaptive filter for subtracting an additional filtered signal of an additional adaptive filter from the speech nulled signal, and generating an additional error signal to the adaptive filter; and the additional adaptive filter being adapted to receive the error signal, and to generate the additional filtered signal representing an estimated component of the desired signal in the error signal, wherein the ANCF control signal is used to update the coefficients of the additional adaptive filter, and wherein the additional error signal is used as a feedback information to the additional adaptive filter.

14. The adaptive noise cancellation microphone system according to claim 3, wherein the adaptive noise cancellation controller comprises a power estimator unit being adapted to receive each of the speech enhanced signal, the speech nulled signal and the output filtered signal, and to generate a corresponding power signal to be received by a silence detector unit and a signal detector unit;

the silence detector unit for detecting whether an acoustical signal is present in the speech enhanced signal input, the speech nulled signal and the output filtered signal, and being adapted to generate a first output signal which indicates whether the acoustical signal is present;

a signal detector unit for detecting whether a desired signal is present in the speech enhanced signal, the speech nulled signal and the output filtered signal, and being adapted to generate a second output signal which indicates whether the desired signal is present;

an adaptive noise cancellation filter controller unit being adapted to receive the first output signal and the second output signal to determine the characteristic of the first input signal and the second input signal, and to generate the ANCF control signal which represents an updated coefficient parameter for updating the coefficients of the at least one filter of the adaptive noise cancellation filtering circuit; and an SFS controller unit being adapted to receive the first output signal and the second output signal to determine the characteristic of the first input signal and the second input signal, and to generate the SFS control signal which represents an updated coefficient parameter for updating the coefficients of the at least one filter of the SFS.

15. The adaptive noise cancellation microphone system according to claim 2, wherein the post processing filtering circuit comprises a FIR filter being adapted to receive the output filtered signal and to generate the digital result signal, a coefficient calculation block being adapted to receive the speech enhanced signal, the speech nulled signal and the output filtered signal, and to generate a coefficient signal representing the coefficients of the FIR filter.

16. The adaptive noise cancellation microphone system according to claim 15, wherein the coefficient calculation block is further adapted to receive a post processing control signal, wherein the post processing control signal is also used to generate the coefficient signal representing the coefficients of the FIR filler.

17. The adaptive noise cancellation microphone system according to claim 2, further comprising a Digital-to-Analog converter for converting the digital result signal to an analog signal, thereby generating an output result signal.

18. The adaptive noise canceling microphone system according to claim 1, further comprises a first amplifier and a second amplifier for receiving and amplifying signals resulting from the sounds received by the two microphones;

a first low pass filter and a second low pass filter for receiving and filtering the amplified signals from the first amplifier and the second amplifier, thereby generating analog amplified and filtered signals;

a first Analog-to-Digital converter and a second Analog-to-Digital converter for receiving and converting the analog amplified and filtered signals to digital signals, thereby generating the first input signal and the second input signal.

19. The adaptive noise canceling microphone system according to claim 1, further comprising an adaptive noise cancellation microphone (ANCM) controller for receiving the speech enhanced signal, the speech nulled signal and is the output filtered signal, the adaptive noise cancellation microphone (ANCM) controller being adapted to generate an adaptive noise cancellation filter (ANCF) control signal and an SFS control signal for updating coefficients of at least one filter of the SFS and adaptive noise cancellation filtering circuit, respectively, using the received speech enhanced signal, the speech nulled signal and the output filtered signal.

* * * * *